(12) United States Patent
Strobl et al.

(10) Patent No.: US 6,771,870 B2
(45) Date of Patent: Aug. 3, 2004

(54) COMPONENTS AND METHODS FOR MANUFACTURING HOLLOW INTEGRATORS AND ANGLE CONVERTERS

(75) Inventors: Karlheinz Strobl, Mount Sinai, NY (US); Paul Gasteiger, Ronkonkoma, NY (US)

(73) Assignee: eele Laboratories, Bohemia, NY (US)

( * ) Notice: Subject to any disclaimer, the term of this patent is extended or adjusted under 35 U.S.C. 154(b) by 0 days.

(21) Appl. No.: 10/101,194

(22) Filed: Mar. 19, 2002

(65) Prior Publication Data

US 2004/0126077 A1 Jul. 1, 2004

Related U.S. Application Data

(60) Provisional application No. 60/277,224, filed on Mar. 20, 2001.

(51) Int. Cl.$^7$ ................................................. G02B 6/00
(52) U.S. Cl. .................. 385/133; 385/146; 385/901; 362/257; 362/297; 362/298; 362/317; 362/346; 362/559; 362/560
(58) Field of Search .......................... 385/31, 133, 147, 385/901; 359/859; 362/257, 297, 398, 302, 317, 346, 559, 560

(56) References Cited

U.S. PATENT DOCUMENTS

| | | | |
|---|---|---|---|
| 3,740,112 A | * | 6/1973 | Lundgren .................. 385/133 |
| 5,493,483 A | | 2/1996 | Lake ......................... 362/346 |
| 5,548,440 A | | 8/1996 | Hohenegger et al. ....... 359/360 |
| 5,571,570 A | | 11/1996 | Lake ......................... 427/494 |
| 5,625,738 A | | 4/1997 | Magarill ..................... 385/146 |
| 5,751,474 A | | 5/1998 | Hohenegger et al. ....... 359/360 |
| 5,777,789 A | * | 7/1998 | Chiu et al. .................. 359/494 |
| 5,842,767 A | | 12/1998 | Rizkin et al. ................ 362/32 |
| 5,956,447 A | * | 9/1999 | Zel'Dovich et al. ........ 385/116 |
| 6,128,126 A | | 10/2000 | Hohenegger et al. ....... 359/300 |
| 6,231,199 B1 | * | 5/2001 | Li .............................. 359/857 |
| 6,332,688 B1 | * | 12/2001 | Magarill ..................... 359/858 |
| 6,356,700 B1 | | 3/2002 | Strobl ........................ 385/147 |
| 6,456,362 B1 | * | 9/2002 | Banine ....................... 355/67 |

FOREIGN PATENT DOCUMENTS

| | | | |
|---|---|---|---|
| EP | 0734183 B1 | 1/2001 | |
| JP | 60140202 A | * 7/1985 | ............ G02B/6/00 |

OTHER PUBLICATIONS

Wayne Gregory Sainty (thesis), "Protection of Optical Surfaces by Thin Films", 1994, Incorporated by reference, see particularly pp. 35–41, School of Physics, University of Sydney, Sydney, Australia.

* cited by examiner

Primary Examiner—Brian Healy
Assistant Examiner—Daniel Petkovsek
(74) Attorney, Agent, or Firm—James J. Lillie; Lillie Law, LLC

(57) ABSTRACT

The present invention describes an "L"-shaped sub-component for a hollow reflective tube used as integrator and/or angle converter for an illumination system. Furthermore, this invention details methods of manufacturing such hollow reflective tubes comprising (1) the steps of forming "L"-shaped sub-components substrates with or without self-alignment and/or mounting features, (2) applying a reflective coating to the inside of said sub-components (3) and assembling said sub-components into hollow tubes. Preferably both sides of the "L"-shaped sub-components have identical spectral and angular dependent coating performance. A particularly suitable method for manufacturing these sub-components substrates is molding them in plastic and over-coating them with a base coating layer to enhance their specular reflectivity. One of the preferred methods of applying a highly reflective, environmentally stable enhanced Ag multi-layer stack is an ion-assisted e-beam deposition process with the substrates oriented symmetrically towards the effective thin film material emission source. The high index layer material is preferably a metal oxide or ZnS and the low index material is preferably an oxide or a fluoride material.

14 Claims, 9 Drawing Sheets

Prior Art

COMPONENTS AND METHODS FOR MANUFACTURING HOLLOW INTEGRATORS AND ANGLE CONVERTERS

CROSS-REFERENCES TO RELATED APPLICATIONS

This application is entitled to the benefit of U.S. Provisional Patent Application Ser. No. 60/277,224 filed Mar. 20, 2001, entitled "Components and Methods for Manufacturing hollow Integrators and Angle Converters"and is related to U.S. Pat. No. 6,356,700, issued Mar. 12, 2002, entitled "Efficient Light Engine Systems, Components and Methods of Manufacture".

FEDERALLY SPONSORED RESEARCH

This application arose out of work under Contract #RFP00-58F, Dec. 1, 2001, with the U.S. Display Consortium.

FIELD OF THE INVENTION

This invention relates generally to components and the method of manufacturing of hollow reflective tubes, and specifically relates to reflective tubes used as integrators and/or angle converters for illumination systems.

BACKGROUND OF THE INVENTION

Some optical illumination systems benefit from the use of a spatial and/or an angular beam reformatting element to reformat the spatially dependent and/or the angular dependent intensity distribution of a light beam. For example, U.S. Pat. No. 5,625,738 to Magarill describes the use of a straight or symmetrically tapered, hollow, light transmitting tunnel with a rectangular input and output cross sectional shape as an optical element to increase the spatially dependent illumination uniformity of a light valve in a projection display system. European Pat. No. 00734183/EO B1, to Chiu et al. notes that "typical illumination schemes usually produce non-uniform illumination on the light valves resulting in poor intensity uniformity . . . " and teaches a light tunnel comprised of four mirrors assembled to form a hollow rectangular tunnel. U.S. Pat. No. 5,842,767 Rizkin et al. describes another use of a symmetrically tapered hollow cone as an angle converter element to increase the coupling efficiency of an elliptical reflector lamp to a large, round fiber optic bundle input area. While these and other patents describe the use of hollow reflective tubes as integrators and/or angle converters, they don't describe, in general, a preferred manufacturing method.

The present invention is related to U.S. Pat. No. 6,356,700 of one of the authors of this invention (Strobl) which utilizes, among other things, asymmetrically stretched, hollow anamorphic reflective tubes as integrators and/or angle converter elements to increase the delivery efficiency of an etendue efficient Minimal Light Engine (lamp reflector module) having an asymmetric angular dependent energy distribution in its exit beam that is optically coupled to a light valve or fiber optic light guide. With the emerging large volume market for light valve containing projection display systems for the home entertainment market, there is a need to be able to produce a wide variety of differently shaped, highly reflective rectangular tubes in high volume and at low cost, for use as integrators and angle converters.

When hollow rectangular tubes are manufactured for light beam integrator and/or angle converter applications, the usual prior art method is (1) to manufacture a large sheet of mirror-surfaced material (reflective material), and then (2) to cut or break the reflective material into four suitably sized rectangular sub-components, (3) to assemble these sub-components into a rectangular shaped tube and (4) to glue the four assembled sub-components together to form a permanent and rigid reflective rectangular tube. When a focused light beam is transmitted through such a device, repeated multiple light reflections cause an integration (beam homogenization) of the spatially dependent light intensity distribution. When the four sub-components are assembled in a non-parallel manner, for example as 1-dimensional or as a 2-dimensional rectangular taper, the angular dependent intensity distribution of the incoming focused beam gets modified. In this case, the reflective tube has, beside a spatial beam intensity integration function, also an angle converter function.

The process of cutting or breaking the reflective sheets into the respective rectangular sub-components and their subsequent assembly into a rectangular tube leads to small edge defects (chips) and/or small areas of separation or cracks between the coating and the substrate. In time, these fault areas can lead to a degradation of significant usable area of the reflective coating surface, resulting in parallel in a significant reduction in transmission performance. The transmission efficiency of such a manufactured reflective tube is further reduced by the size of the total area of the gaps and edge imperfections in the four corners between the four assembled neighboring sub-components. This transmission defect is caused by the above-described traditional sub-component manufacturing process. Additionally, this prior art manufacturing process allows economically viable high volume production of rectangular tubes only with a dimensional tolerance of about 100 $\mu$m. While this is only a small dimensional uncertainty, it can lead to significant effective transmission losses for very small rectangular integrators. This is in particular important because the overall shortest dimension of a typical integrator for projection display application is already in the range of 4–5 millimeters. The OEM projection display market anticipates that in the near future, when smaller and lower cost light valves become commercially viable for rear projection display systems, the integrator dimensions will shrink proportionally, thus leading to even higher effective transmission losses.

In addition, inside a projection display light engine, the temperature of such hollow reflective tubes is often elevated. Higher efficiency projection illumination technologies are coming to the market in the coming years. These technologies increase the energy density inside such reflective hollow tubes even further. Since there is always some absorption loss even with the best reflective coatings, this increased energy density loading causes a higher head load on the reflective hollow tube components and materials. This increased head load, if not properly managed can lead to a new long term product defect, where the glue holding the four sub-assemblies together becomes mechanically unstable with time, and the performance of the respective projection device is compromised.

Thus, in order to make mass producible, low cost and high performance, small hollow reflective rectangular tubes possible, a new manufacturing method is needed, that, while still suitable for large-scale production, does not suffer from at least some of the above outlined deficiencies.

Traditionally a thin film Ag (silver) over-coating produces the highest substrate reflectivity enhancement in the visible spectral range over a broad range of incident angles. However, the reflectivity of Ag in the visible spectral range has a poor environmentally dependent performance. This is (1) mainly due to its softness, which can lead easily to coating damage during handling, (2) due to its low temperature stability limit (Ag re-crystallization effects cause a surface roughness increase and reflectivity loss above 100 deg C.), and (3) due to the fact that it corrodes readily if it is exposed to air without protection (sulfur binds with Ag and reduces its reflectivity dramatically), i.e. it's reflectivity in the blue spectral region drops quickly. For these reasons, it is desirable to overcoat Ag with at least one barrier layer. Such a barrier layer must be cohesive to avoid pits, where corrosion of the Ag could begin, and must be hard, to prevent physical damage to the Ag.

U.S. Patent No. 6,128,126, to Hohenegger et al. (Hohenegger I) teaches that while various metal oxide coatings may be used for their hardness and resistance to environmental contaminants, the oxide layer can "cause a degradation of the silver". Hohenegger I mentions various methods to overcome this, such as first covering the Ag layer with further metallic layers to form a barrier between the Ag and the oxide. However, Hohenegger I teaches away from the use of metal oxides and in particular from $TiO_2$ layers stating "The solutions attempted in the prior art described above, which suggest packing the Ag containing layer with a metal or a hypostoichiometric oxide layer, fail since as a rule these do not meet the optical specification in any case, at least not with very high reflection values in the visible spectral range at 0–45 deg incident angles." U.S. Pat. Nos. 5,751,474 and 5,548,440 to Hohenegger et al. (Hohenegger II and III) while utilizing Ag for the mirror and silicon dioxide and titanium in the barrier layer, teach titanium use only in the form of oxynitrides and not oxides.

U.S. Pat. Nos. 6,128,126, 5,751,474, and 5,548,440 to Hohenegger et al. (collectively Hohenegger) which for brevity are incorporated herein by reference, collectively teach compositions utilizing zinc sulfide as a nucleation layer for forming the Ag reflecting layer on the base substrate and also as an outer protective and high index material layer. Hohenegger also teaches the use of magnesium fluoride or silicon dioxide as barrier and low index material layers. Hohenegger further teaches copper as an additive to the Ag for the purpose of increasing its environmental performance.

The present invention, in contrast to Hohenegger, achieves the very high reflection values of environmentally stable Ag coatings described by Hohenegger, even when substituting the recommended ZnS material with a metal oxide material ($Ta_2O_5$, $TiO_2$, $ZrO_2$, etc.), which has been deposited with an ion assisted, e-beam thin film vacuum deposition process.

It is therefore an objective of this invention to provide a method for manufacturing hollow reflective tubes for use as integrators and/or angle converters in illumination systems and in particular for projection display and for fiber optic illumination systems.

It is another objective of this invention to provide a method for high volume capable, low cost manufacturing of hollow integrators and/or angle converters.

It is still another objective of this invention to provide a method for manufacturing sub-components of hollow integrators and/or angle converters.

It is still another objective of this invention to manufacture sub-components which have a continuous reflective coating applied, such that this coating is not fractured during any manufacturing steps near any edges of the optical usable surface area.

It is still a further objective of this invention to facilitate the low cost building of complex shapes, such as two-stage integrators and/or angle converters having a high usable light transmission performance.

It is still another objective of this invention to build more thermally stable reflective tubes that can handle a higher energy load.

It is still a further objective of this invention to provide additional features to each respective sub-component to facilitate inter sub-component alignment and reflective tube to illumination system alignment.

It is still another objective of this invention to utilize a metal oxide ($Ta_2O_5$, $TiO_2$, $ZrO_2$, etc.) or ZnS as a high index material, and $SiO_2$ or $MgF_2$ ($BaF_2$, $YF_3$, etc.) as a low index thin film material to enhance and/or environmentally protect thin film Ag coatings on respective sub-component substrate surfaces.

By reviewing and considering the drawings and descriptions further objects and advantages of the present invention will be apparent.

BRIEF SUMMARY OF THE INVENTION

The present invention is based on the realization that the manufacturing process of hollow, highly reflective tubes for integrator and/or angle converter applications in illumination systems is improved if at least some of the features described below are contained in the respective manufacturing process: (1) There should be as few different sub-components as possible, preferably having only two optically functional flat sides connected with each other, (2) the reflectivity enhancing production method of the various surfaces of the respective sub-components should ideally be made in a substantially uniform manner, (3) multiple individual sub-components should be manufacturable and able to be handled as a single unit and should only be separated into individual sub-components after the respective inside surface reflectivity enhancing process is completed and before their final assembly into the desired reflective tube shape, (4) there should preferably be a way to add (deposit, glue, bond, etc.) a highly reflective surface layer on the inside of optically functional surfaces of the respective sub-component in a low cost way, and (5) there should be no edge damaging processing step near the functional surfaces edges after the respective reflectivity enhancing manufacturing process steps, in order to maximize the environmental stability of each sub-component, i.e., to minimize their potential reflectivity degradation over a long time period.

The present invention describes a method of manufacture of hollow reflective tubes out of sub-components that are designed and manufactured in such a manner that they allow precise and low cost assembly into the respective reflective hollow tubes to precise mechanical tolerances, for use as integrators and/or angle converters. These sub-components preferably are "L"-shaped and optionally include suitable alignment and/or mounting features that facilitate sub-component alignment with respect to each other and/or optionally facilitate the alignment of the reflective tubes to a respective illumination system.

The present invention also describes several preferred manufacturing methods including molding of the respective sub-components and the application of a highly reflective coating onto the optically functional inside surfaces of the respective sub-components in such a manner that each functional surface gets a substantially similar coating deposited. Optionally, the specular reflectivity (brilliance) of each optically functional surface is enhanced by the application of a surface enhancement layer (base coating) whose purpose is primarily to reduce the surface roughness of the substrate surface, and optionally to facilitate adhesion and/or temperature cycling of the final component.

The preferred method of manufacturing the desired reflective tube is then a simple assembly process of such prepared sub-components facilitated by the design of the respective sub-components, which may include optional self-alignment features and/or system alignment features. Any glue that may be used to bond multiple sub-components together preferably now has only a bonding and does not include a structural function, thus lessening the device's performance sensitivity to an increased heat load.

Preferably, the number of components needed to build a hollow tube is kept to a minimum and all the sub-components are substantially symmetrical and/or identical. Often one of the symmetry planes of the desired reflective tube is used to decompose the target shape into manufacturable sub-components. In general, production throughput, parts costs, reflectivity specs, environmental stability and heat load resistance dictate the optimum design solution of the respective sub-component shapes together with the process constraints of the chosen reflectivity enhancing manufacturing process.

A preferable method of manufacturing the respective sub-components of this patent is injection, transfer or compression molding of high temperature capable glass fiber-filled plastic resins (glass filled plastics). Preferably, the resin is chosen such that the final sub-component is mechanically stable over the desired temperature range dictated by the application. Thermoplastic and thermosetting materials that don't flow or move when exposed to temperatures >100 C are therefore preferred. The inside surface of these sub-components is then preferably coated with a base coating as a specular reflectivity enhancing and/or adhesion promoting under-layer, i.e., a scatter reducing film.

One of the preferred manufacturing processes enables the usage of multi-cavity forming tools. This in turn enables the manufacturing in one step of multiple sub-component substrates that are mechanically connected as one unit and as such facilitate economical cleaning and handling during the various steps needed to add the desired reflectivity enhancing surface coatings. Before the final assembly of the sub-components into the reflective tube, the individual sub-components can then simply be separated (for example broken off or sawed apart) from the multi-unit part and assembled together without risk of damaging the reflective coating near any edges of any functional surfaces.

Another preferred embodiment of the present invention describes the usage of a low temperature, ion-assisted, e-beam thin film deposition process, allowing the utilization of, among other things, plastic substrates and lower temperature surface enhancement layers, and prevents degradation of the Ag layer during the coating process. This method also enables the utilization of metal oxide material like $Ta_2O_5$ or $TiO_2$ as high index materials, and $SiO2$ and $MgF2$ as low index material to enhance the reflectivity and environmental stability of highly reflective Ag films.

A preferred method of mounting the respective sub-components in a vacuum deposition chamber, to obtain uniform coating thickness depositions on all respective optically functional surfaces, is also presented in the present patent application.

REFERENCE NUMERALS IN DRAWINGS

Figure 1:
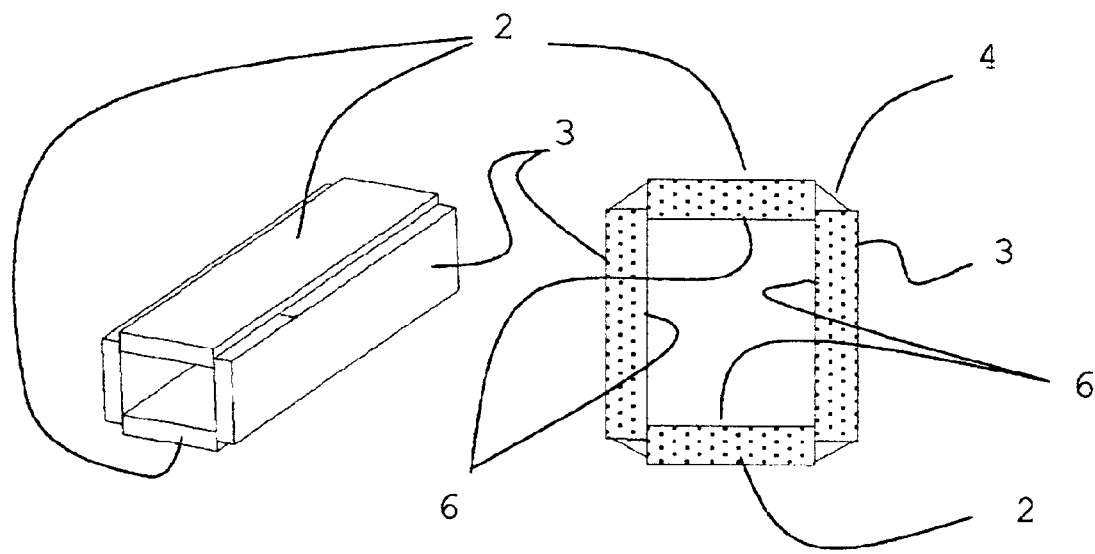
FIG. 1 shows a reflective, rectangular, hollow tube made with a prior art manufacturing process from four individual flat sub-components.

2 Prior art matched reflective sub-component pair
3 Prior art matched reflective sub-component pair
4 Glued bond
6 Reflectivity enhancing coating
8 Reflective "L"-shaped sub-component Alignment feature
11 Alignment feature
12 Reflective "L"-shaped 1-D tapered sub-component
13 A Plane of symmetry of the reflective tube
14 Reflective "L"-shaped two stage, 1-D tapered sub-component 16 Transition zone between 1D-tapered and straight section
18 1-D Tapered section Straight section
24 Reflective "L"-shaped sub-component with 120 degree angle Small angle between the sides of an "L"-shaped sub-component
26 Multi sub-component substrate unit
27 "L"-shaped sub-component for straight reflective hollow tube
28 Alignment truncated cone Conical alignment hole
32 System mounting shoulder
34 System mounting hole Break region for separation of multi-unit into individual "L"-shaped sub-components
36 "L"-shaped sub-component for 1-D tapered reflective hollow tube
37 Interlocking alignment shoulder
38 Matching interlocking alignment shoulder
39 Substrate
40 Reflective thin film stack
42 Surface preparation layer
50 Uncoated "L"-shaped sub-component substrates
52 Rotating dome holding substrates
54 Rotation axis of dome
56 E-beam source
58 Radius of effective ring e-beam source
60 Ion source
62 Ring e-beam source
64 Uniformity mask
72 Optional bonding/sealing layer
74 Optional ZS layer
76 Ag or Ag/Cu mirror layer
78 Metal fluoride layer
80 ZnS layer
82 Optional sealing layer
84 Low index oxide of fluoride layer
86 High index oxide layer

DETAILED DESCRIPTION OF THE INVENTION

A first prior art manufacturing method for manufacturing hollow rectangular integrators is summarized below. As explained in Hohenegger I and shown in FIG. 1, large sheets of thin glass can be coated inside a thin film vacuum deposition chamber with an environmentally-stable Ag coating having reflectivity of >98% for un-polarized light at an incident angle of 0–45 degrees. Next, these coated glass sheets are cut and/or broken into small rectangular or trapezoidal sub-components 2 and 3. Then four of these sub-components comprising two matching pairs 2 and 3 are positioned in a fixture at precise mechanical tolerances and glued together with glue 4 (for example epoxy) in such a manner that they form a rigid, hollow, rectangular-shaped reflective tube. The sub-components 2 and 3 are oriented such that their reflectivity enhancing coating 6 is located on the optically functional inside surface of the reflective tube.

This prior art manufacturing process allows the manufacture of hollow, rectangular tubes to tight mechanical and optical tolerances (100 $\mu$m) that have either (1) a constant (straight), or (2) a single stage and 1-D (1-dimensional) tapered, or (3) a single stage and 2-D (2-dimensional) tapered, axially (longitudinal axis) varying cross sectional shape. This manufacturing process requires scribing, breaking, grabbing and moving steps and requires substantial handling of the respective sub-components. These multiple handling steps can result in chipping of the thin (typically 1–1.1 mm thick) glass sub-components. Either one of these production defects potentially reduces the production yield and/or transmission efficiency of this prior art manufacturing process. Because the reflectivity enhancing Ag coating has to be broken with the glass substrate, structural damage of the thin film near the scribe lines can occur. Over the years, the environmental stability of the associated Ag layer can be affected causing a reflectivity degradation growing from the edges towards the center of the sub-components, thus resulting in a reduced lifetime performance.

FIG. 1 shows such a rectangular reflective hollow tube that has been assembled, using the above described prior art process, out of four sub-components, i.e., two pairs of two identical sub-components 2 and 3. Such manufactured hollow integrators are commonly found today in lightweight, portable projection display systems and are used to improve spatial uniformity of the focused light beam, emitted from an elliptical reflector lamp system, at the light valve. U.S. Pat. No. 5,625,738 to Magarill, which for brevity is incorporated herein by reference, shows a slightly different assembled integrator (different amount of overhang). However, this patent still requires the use of four flat glass sub-components that need to be assembled to tight mechanical tolerances into the desired rectangular, reflective light guiding tunnels.

Figure 2:
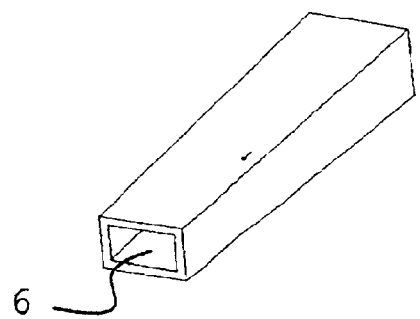
FIG. 2 shows a reflective, rectangular, 2-D tapered, hollow tube made with a prior art manufacturing process as a single component.

A second prior art manufacturing processes is shown in FIG. 2, where a hollow tube is first manufactured as a single part, for example using an electroformed, molding or ceramic firing manufacturing process, and then subsequently coated (for example with a vapor coating deposition process) with a reflective thin film coating 6 on its inside surfaces. FIG. 2 shows an example of a rectangular two-dimensional tapered hollow tube for use as an integrator and angle converter. However, this second prior art manufacturing process typically produces hollow reflective tubes that have much higher light transmission losses than the first manufacturing process described above. One of the reasons for this is the great difficulty of manufacturing long and narrow rectangular tubes to tight mechanical tolerances, with very small corner radii and at low cost, which have sides that are very flat and whose surface finish is extremely smooth (root mean square surface deviation <2 nm), i.e., inside surfaces that don't have significant tool marks defects (scratches from the manufacturing processes) and thus have only a low scattering loss. Another drawback to this second prior art manufacturing method is the inherent difficulties for thin hollow tube (length/height >5x) in being able to economically deposit a thin film stack with high reflectivity (>95%) for a large incident angle range (55–85 deg) and that has a low thin film scatter and low absorption loss across the whole inside surface area (edge effects). An additional difficulty arises near the highly stressed sharp corners of the rectangular, single piece, hollow tube. When such rectangular parts are relieved from their respective forming tools, the stressed corners causes the flat walls of the rectangular tube to bow and thus to deviate their shape from the tight mechanical tolerances needed for many applications, like for example projection display systems.

Figure 3:
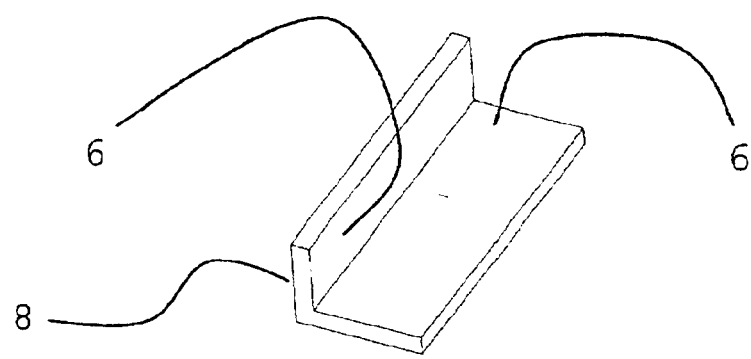
FIG. 3 illustrates a basic "L"-shaped sub-component of the present invention for use in making a rectangular hollow reflective tube.
Figure 4:
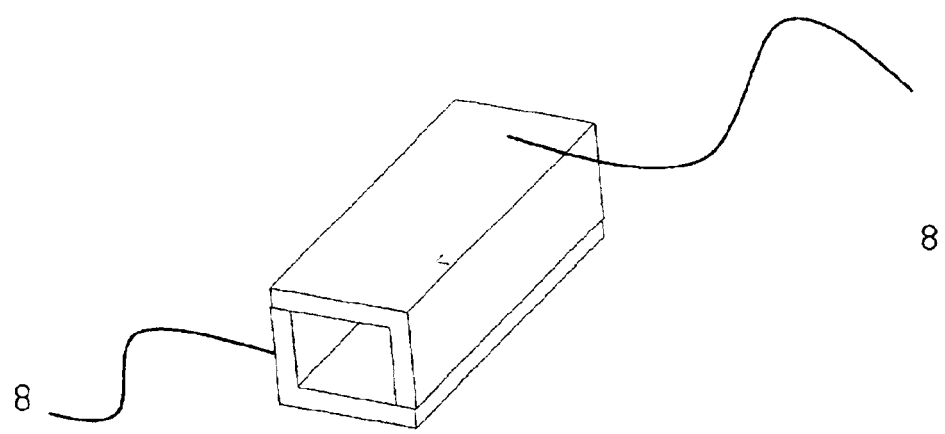
FIG. 4 depicts an assembled reflective rectangular hollow tube of the present invention assembled from two "L"-shaped sub-components.

FIG. 3 depicts a preferred "L"-shaped sub-component of the present invention, which has two interior reflective surfaces 6. FIG. 4 shows the assembly of two such sub-components 8 to create a hollow reflective rectangular tube of the present invention. If a thin film vacuum deposition process is used to increase the reflectivity of the substrate on the inside of the "L"-shaped sub-component, such sub-component is preferably positioned inside a thin film vacuum deposition coating chamber in such manner that both sides of the "L"have the same incident angle towards the effective coating source and thus have substantially the same thin film coating deposition rate across the two functionally relevant interior surfaces.

Light entering the hollow integrator is reflected typically several times off the respective four interior reflective surfaces. These internal reflections cause different portions of the light beam to spatially superimpose. Thus, the longer the beam propagation distance inside such a hollow reflective tube the more (more reflection superposition's) the intensity distribution across the beam propagation axis gets evened out. In this manner, the light exiting such a reflective hollow tunnel has a substantially more spatially uniform intensity distribution across the exit surface area than it has across its input surface area. Typically, an integrator will have a length that allows the light beams to be reflected at least three times. While longer integrator lengths will result in greater uniformity, this gain comes at a cost of light throughput losses since the reflectivity of the reflection surface 6 is typically <100%.

Figure 5A:
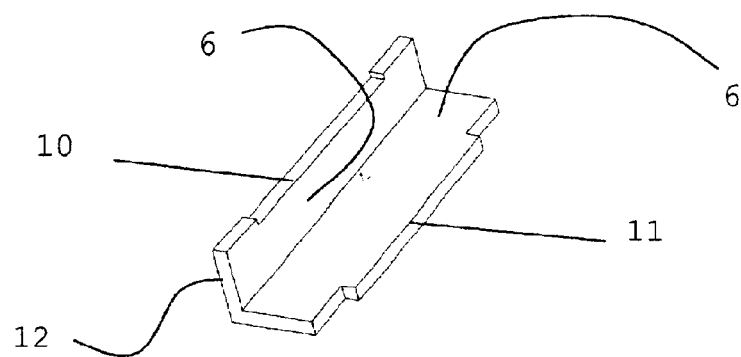
FIG. 5A shows an "L"-shaped, single stage, 1-D tapered sub-component with self-alignment features with two reflective interior surfaces.
Figure 5B:
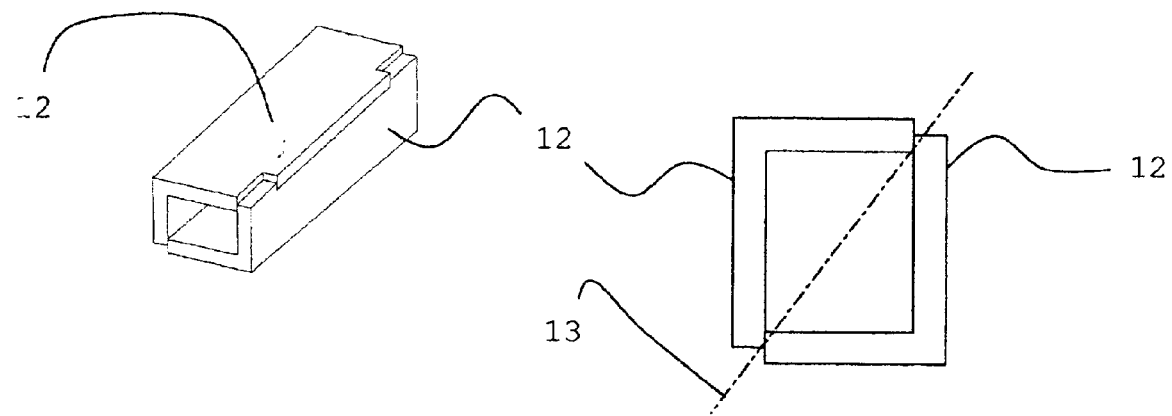
FIG. 5B illustrates a single stage reflective rectangular, 1-D tapered hollow tube assembled from two identical "L"-shaped sub-components of the present invention.

FIG. 5A shows another preferred embodiment of the present invention showing a reflective "L"-shaped sub-component for the case of a 1-D tapered, one stage integrator and angle converter with two interior reflective surfaces 6 and with optional alignment features 10 and 11 to facilitate precision assembly of the two sub-components 12 with respect to each other into a hollow reflective 1-D tapered rectangular tube. FIG. 5B depicts, in a perspective and in an cross sectional view, perpendicular to the longest tube dimension, the assembly of two of such symmetrical "L"-shaped sub-components 12 to produce the desired hollow optical element, i.e., a reflective hollow rectangular tube. The optional set of self-aligning interlocking features 10 and 11 allow the two "L"-shaped halves to come together without requiring precision alignment equipment. The two parts can then be either glued together and/or held together with mechanical means. Both of these methods are highly independent of the actual heat loading of the respective hollow reflective tube.

FIG. 5B also shows a symmetry plane 13 (parallel to the longest dimension of the rectangular tube) used to deconstruct the target rectangular shape into the two symmetrical and identical sub-components 12. A symmetry plane of the target object is a good starting point to deconstruct the target object into as few and as identical sub-component shapes as possible, with each sub-component having preferably just two sides. A two-sided object cut parallel to the major axis of the reflective tube (longest dimension) has a natural symmetry plane which facilitates the uniform coating of the left and the right side of the respective sub-component as long as the respective sub-component is mounted symmetrically into the incident thin film material deposition flux stream.

Because the shape and size of the input cross sectional area of the respective hollow tube is different in one dimension, the resulting object is a rectangular 1-D tapered, single stage tube. Since the cross sectional profile along and perpendicular to the longest tube dimension is not constant, the angular dependent intensity distribution of an incoming light beam will get compressed or stretched in one dimension depending if the light beam enters the narrower or wider side of the reflective tube. Thus, such an optical device can be used as angle transformer. For example, such a 1-D tapered integrator can be used to transform a beam with a different divergence in a horizontal and perpendicular plane (see U.S. Pat. No. 6,356,700 to Strobl) perpendicular to the main propagation axis of the light beam into an exit beam having a more symmetric divergence in the horizontal and perpendicular dimension as long as the integrator input/output plane is oriented also perpendicular or parallel the horizontal axis and the longest tube dimension is oriented parallel to the main beam propagation axis and the input and output cross sectional area is adjusted accordingly.

Figure 6A:
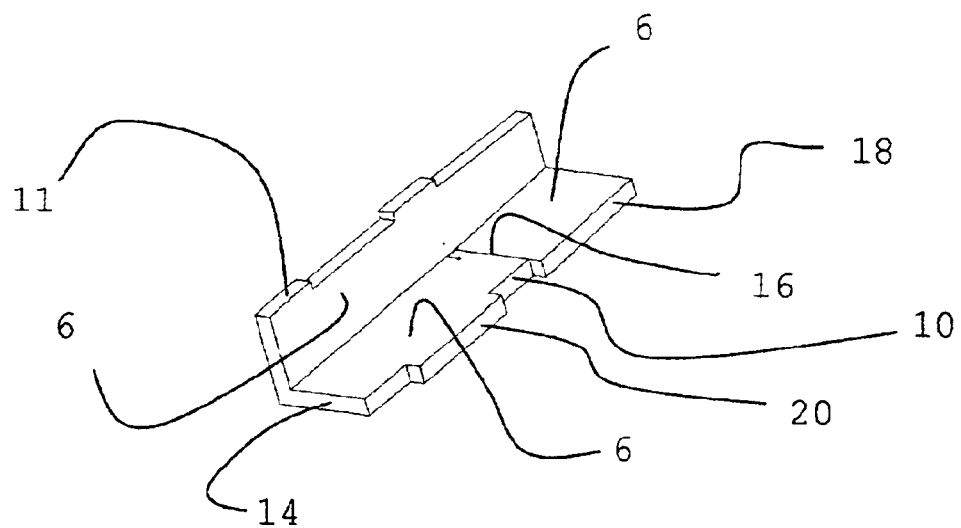
FIG. 6A shows a two stage, one-dimensional tapered "L"-shaped sub-component with alignment features with two reflective interior surfaces.
Figure 6B:
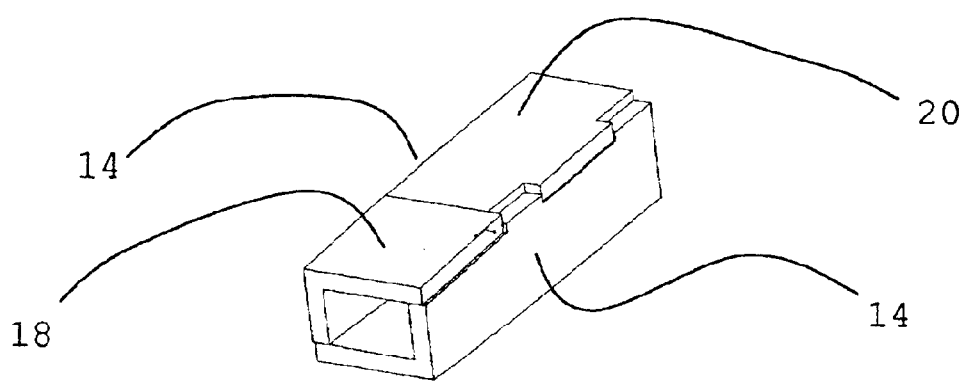
FIG. 6B depicts a two-stage reflective rectangular, 1-D tapered hollow tube assembled from two identical "L"-shaped two-stage one-dimensional sub-components of the present invention.

Similarly, FIG. 6A and FIG. 6B show respectively another preferred embodiment of the present invention with the case of a two-stage, 1-D tapered reflective "L"-shaped sub-component 14 having two reflective surfaces 6 and the assembly of two such identical sub-components 14 into a two-stage 1-D tapered beam converter. The separation line 16 is the transition line between the 1-D tapered nozzle section 18 (angle converter) and the subsequent straight tube section 20 (integrator). Again, optional alignment features 10 and 11 are shown for facilitating the assembly of the two respective "L"-shaped sub-components 14.

Combining two hollow reflective tubes into one rigid and mechanical stable unit is difficult with the above-described first prior art manufacturing process. Typically, the related unavoidable alignment and sizing tolerance problem discussed above cause additional significant transmission losses that are not easily avoidable in mass production and a low cost and result in yield problems. On the other hand, the above described preferred implementation of the present invention alleviates most these tolerance and alignment problems making its nearly as easy and cost effective to build the two stage 1-D reflective tube shown in FIG. 6B as it is to build the simpler one-stage 1-D reflective tube shown in FIG. 5B.

The two-stage integrator design shown in FIG. 6B is sometimes slightly more throughput efficient and thus more desirable for special illumination system applications since only a very short taper 18 is used as a high angle limited angle converter to down-convert basically only the higher incident angles. The lower incident angle basically doesn't intersect with any wall of the tapered nozzle 18 and the angular dependent intensity distribution is thus not changed. The straight integrator section 20 then spatially averages the angle adjusted output beam of the first section 18 together with the not modified portion of the lower angular divergent part of the incident light beam.

Although not shown in any figures, it is clear from the above teachings that the rectangular tapered nozzle 18 of the two-stage integrator shown in FIG. 6B can also be replaced by a more exotic shape, for example one where the input has an elliptical cross sectional shape and the output has the matching rectangular shape. The respective sub-component can then be processed (over-coated) just like the sub-components 14 with the intent to position it in the coating process system in such a manner that the most uniform coating performance is achieved across the respective optically functional surface areas.

Figure 7A:
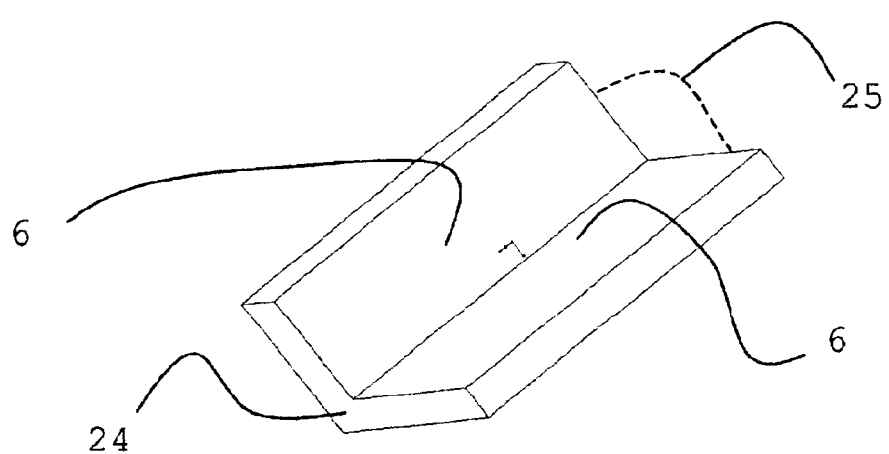
FIG. 7A shows a basic form of an "L"-shaped sub-component of greater than 90 degree angle and with two reflective interior surfaces.

FIG. 7A depicts another preferred embodiment of the present invention showing a reflective "L"-shaped sub-component 24 wherein the small angle 25 between the two connected sides forming the L is 120 degrees. Again, the two respective connected sides forming the "L"-shaped sub-components have preferably a reflective coating 6. With such a sub-component 24, one can make a hollow reflective tube that has a 6-sided cross-sectional shape as shown in FIG. 7B.

Figure 7B:
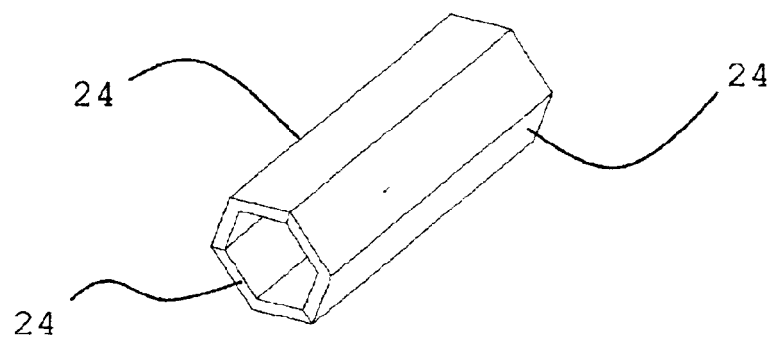
FIG. 7B depicts shows the assembly of three "L"-shaped reflective sub-components to form a hexagonal reflective hollow integrator tube of the present invention.

While FIG. 7B shows a symmetrical, hexagonal tapered, hollow reflective tube, different shapes like a 1-D or a 2-D tapered hexagonal, hollow reflective tube can also be manufactured in an equivalent manner. Not shown in FIG. 7A and FIG. 7B are any optional self-alignment features and/or mounting features to facilitate a quick assembly of the various components and/or its precision mounting with respect to a given illumination system.

By changing the angle between the two connected sides forming the "L"-shaped sub-component, both lower and higher sided polygonal, hollow reflective tubes can be made in a substantial similar manner.

Another preferred embodiment of the present invention is the utilization of molding, extrusion, electroforming, pressing, stamping, hydro-forming, sintering, firing, drawing, forging, casting and machining techniques to manufacture the respective sub-components. In particular, instead of utilizing float glass material (typically used in the first prior art manufacturing methods because of it extremely low surface roughness (RMS≈0.2A)), which in general doesn't allow successful bending into an "L"-shaped component or the molding or extruding of "L"-shaped components with very square corners and to tight mechanical dimensions, the present invention teaches utilizing plastic materials (preferably glass fiber filled for increased mechanical stability), specialty glass materials modified for this application, ceramic materials, glass ceramic materials, composite materials, metal sheets or any other material and processes which are capable of manufacturing solid "L"-shaped sub-component substrates to tight mechanical tolerances with a very small corner radius (<0.5mm) and surfaces that can further be sufficiently smoothed with an optional surface preparation layer (base coat application).

In particular, thermoplastic and thermosetting resins are preferred that have a high mechanical stability at temperatures up to 150 C and above and that are injection, transfer and/or compression moldable. For example, a preferred material choice to mold the respective "L"-shaped components of the present invention is the BMC 304 material manufactured by Bulk Molding Compounds Incorporated, Illinois. This material is a low profile, automotive grade molding compound that is suitable for injection, compression or transfer molding operations. The BMC 304 material can be over-coated with a base coating using traditional or electrostatic coating systems and demonstrates excellent adhesion characteristics. A preferred base coating material (see U.S. Pat. Nos. 5,493,483 and 5,571,570 to Lake) is for example the UVB553R or UVB63R2SAL UV Curable Basecoat material manufactured by Red Spot Paint & Varnish Co. Incorporated, Indiana that are typically applied with a 16–20 µm thickness to increase the specular reflectivity (reduce surface scatter, i.e. surface RMS) of the respective substrate surface.

Figure 8A:
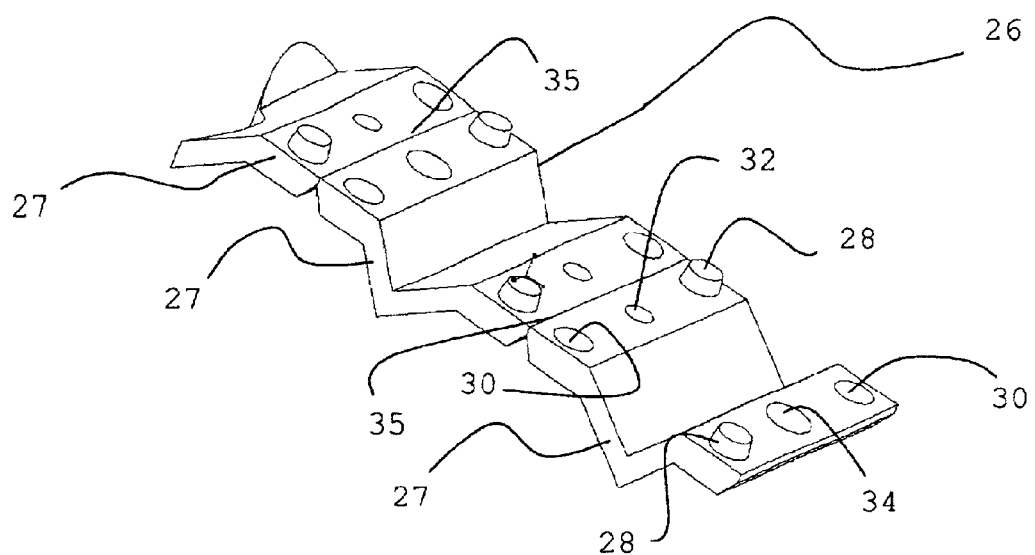
FIG. 8A depicts a 3-D view of a multi sub-component substrate for multiple "L"-shaped, straight, sub-components with alignment and mounting features of the present invention.

FIG. 8A illustrates another embodiment of the present invention, wherein the respective sub-component for a straight hollow rectangular tube is designed for a molding manufacturing process utilizing a multi-cavity tool. The respective molded multi sub-component substrate unit 26 is formed as a unit comprising multiple sub-components 27. Each such sub-component 27 is shown with optional truncated conical shaped alignment posts 28 and matching conical reception holes 30, and with an optional system mounting hole with alignment shoulder 32, and matching mounting hole 34. The individual "L"-shaped sub-components 27 are connected by a breakable transition border 35 to each other. When broken at the separation region 35, two matching "L"-shaped the sub-components 27 are obtained that can be assembled (folded over) to form a hollow rectangular tube with the alignment features 28 and 30 facilitating a self-alignment of the two sub-components 27 with respect to each other. The mounting features 32 and 34 facilitate the precision mounting of the assembled hollow reflective tube with respect to an illumination system.

The multi sub-component substrate unit 26 design allows reduced handling and mounting costs during the multiple optional base coat and reflective coating application process steps. In this manner the bond between the reflective coating layer 6 and the substrate can be damaged only near the separation region 35 which is physically far from the edges of the functional surfaces of the reflective rectangular tube. Thus, this is in general not a concern for the long-term environmental stability of the reflective coating (over a period of 5–10 years) as long as the reflective coating itself is environmentally stable on that time scale.

Figure 8B:
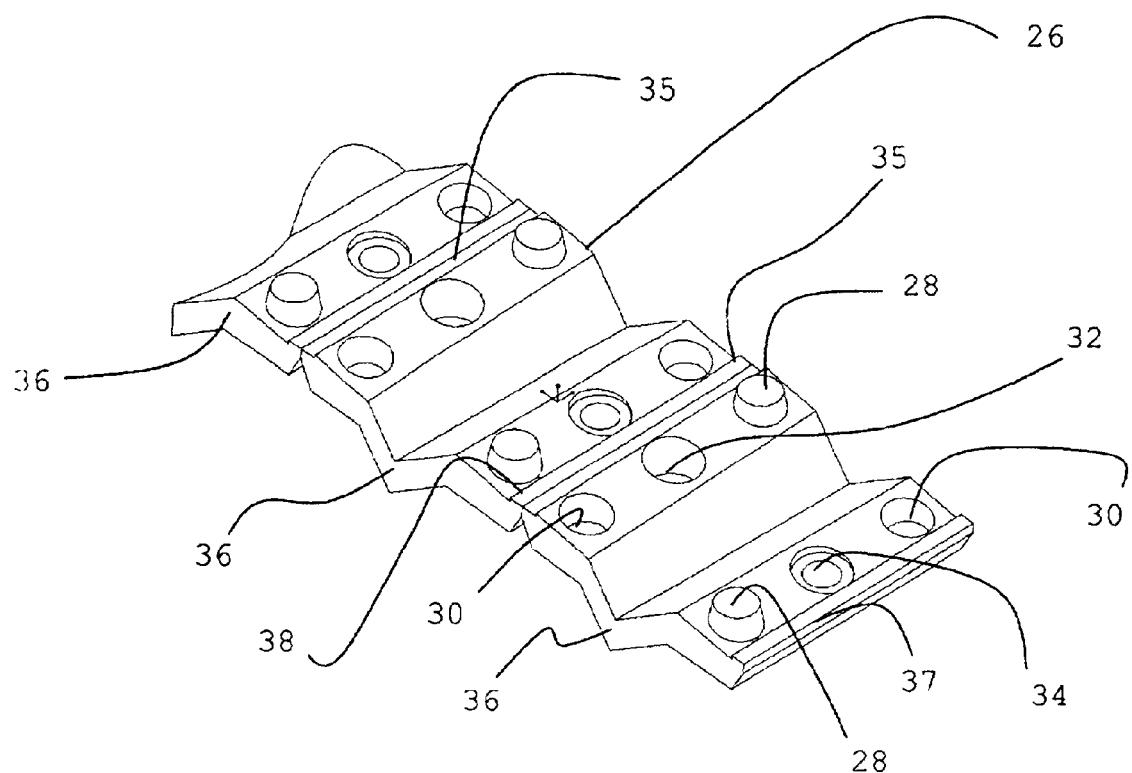
FIG. 8B depicts a 3-D view of a multi sub-component substrate for multiple "L"-shaped, 1-D tapered, sub-components with alignment and mounting features of the present invention.

FIG. 8B depicts a different preferred embodiment of the present invention similar to that of FIG. 8A, wherein the "L"-shaped sub-components 36 are now designed to produce, after assembly, a 1-D tapered hollow reflective tube from two identical "L"-shaped sub-components 36. The additional mounting shoulders 37 and 38 facilitate the self-alignment between the two respective "L"-shaped sub-components 36. Note that here the deconstruction of the desired 1-D tapered hollow rectangular tube is done along a respective symmetry plane in such a manner that two identical sub-component shapes resulted. While in general this is preferred for manufacturing cost reduction reasons, this design constraint condition poses some limitation on the design, which limits slightly the alignment mounting feature options of the overall unit to a given illumination system. Thus, optionally two different, but matching "L"-shaped sub-components can be designed and be part of the same or of a different multi sub-component substrate unit 26 when desired without limitation to the present invention.

In principle, tubes of various shapes and functions may be assembled from a plurality of sub-components. Discussed in detail here are the sub-class of hollow reflective tubes having at least one n-shaped polygonal cross section perpendicular to the longest dimension of the reflective hollow tube. The teachings of the present patent can be extended by those skilled in the art to any type of hollow reflective tube, for example also to cylinders, elliptical tapered, transformation shapes from an elliptical to rectangular form, etc. The respective sub-components of such non n-polygonal hollow tubes, according to this patent, comprise at least one flat optically functional surface area region. This results effectively in a less uniform reflectivity performance across the usable surface area than is possible when only two flat sides need to be uniformly coated. However, the present invention can typically still be adapted by those skilled in the art to improve over prior art performance specifications.

Without limitation, any such extensions of the present teachings to a more general form of hollow reflective tube is hereby considered to be included in this patent application.

Figure 9:
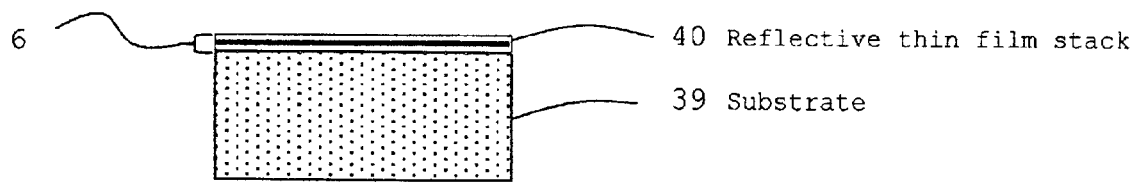
FIG. 9 depicts, in magnified cross section, a view of the basic surface preparation of the hollow reflective tube sub-components of the present invention.

As stated above, the optically usable surface of a respective hollow tube sub-component of the present invention must have a reflectivity enhancing coating (or more general reflective layer) 6 in order to be usable as integrator and/or angle converter in an illumination system. FIG. 9 shows the most basic surface reflectivity enhancement method of the present a invention where the substrate 39 of the respective sub-component is overcoated with an adherent and reflective thin film multi-layer stack 40.

Two of the above discussed preferred low cost manufacturing processes to make the required L-shape sub-components are molding and/or electroforming. Both processes are basically copy processes which copy not only the desired tooling surface figure, but with it also most surface imperfections (scratches) of the respective surface shaping tool. With continuous use, the surface of these forming tools wears. This leads to an increasing surface roughness of the produced substrates with the number of parts produced (copied). For example, the hard glass fibers imbedded in the molding compound contribute to a mold tool surface wear. During the separation process of electroformed tools from the hard Ni-substrates, the tool often gets scratched from sharp substrate edges. Additionally during the electroformed manufacturing process the tool surface sometimes gets coated locally with a very thin, but hard chemical surface stain. During the subsequent removal process of these stains, the tool gets scratched and its surface roughness increases.

Many manufacturing processes which would allow the creation of the required sub-component shapes in mass production and low cost, do not necessarily also produce optically-smooth surfaces. When the thin film multi-layer stack 40 is applied over a given substrate surface the underlying roughness is transferred to the top of the reflective coating and thus reduces the specular reflectivity (scattering) of a resulting reflective surface layer 6. Since typically each light ray is reflected multiple times before it leaves the hollow integrator, these scatter losses should be kept to a minimum.

Figure 10:
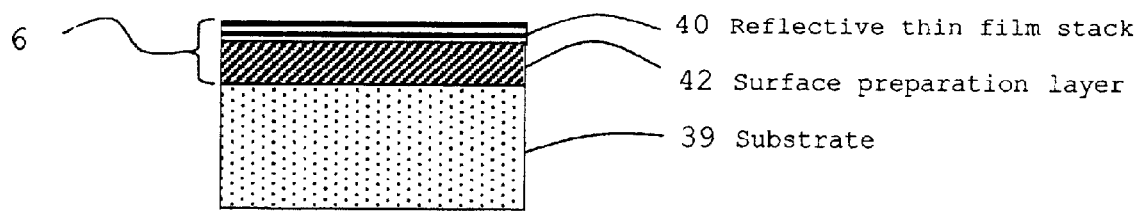
FIG. 10 shows a magnified cross sectional view of a further improved surface preparation of the hollow reflective tube sub-components of the present invention.

FIG. 10 shows an optional improvement to the preferred basic surface reflectivity enhancement method, where at least one additional surface preparation layer 42 is put between the substrate 39 and the reflective thin film stack 40. The purpose of such a surface preparation layer is typically to enhance the specular reflectivity of the surface of the bare substrate by reducing its surface roughness. Other examples of such surface preparation layers 42 are adhesive promotion and/or sealing layers.

When a liquid layer of sufficient thickness and sufficient viscosity and surface tension is applied on top of a rough surface, the surface tension of the liquid acts as a surface roughness low pass filter that smoothes out the underlying high spatial frequency surface features. A properly done subsequent solidification of the liquid surface will preserve most of this reduced surface roughness and provide a new smoother surface on top of which the film multi-layer stack 40 can be deposited. This preferred enhanced manufacturing process of the present invention allows therefore the manufacturing of sub-components with improved specular reflectivity performance and thus of higher transmissive reflective hollow tubes.

A preferred example of such a reflectivity enhancing surface preparation layers 42 are the two UV curable base coating materials describe above as base coatings in combination with molded BMC molded plastic substrates. A suitably designed, thin, glass-like surface preparation layer (glaze, glass, enamel) on top of a fired injection molded ceramic part, can function in the same manner as specular reflectivity enhancing surface preparation layer 42 because it can transition from a liquid "surface healing" to a frozen solid state. Thus, the surface roughness of fired ceramic can be improved to closer to that of molded glass. Similarly, metal surfaces can be treated (polished) or over-coated in any manner that increases their specular reflectivity and doesn't destroy their surface figure accuracy.

Without limitation to the present patent application the reflective thin film stack 40 and/or the optional surface preparation layer 42 may be deposited by thermal evaporation, e-beam deposition, ion assisted e-beam deposition, spattering process, DC, AC, microwave assisted and reactive spattering processes, chemical vapor deposition, dip coating, spin coating, spray coating, plasma coating, or a combination of these methods. Another preferred process is the bonding of a highly reflective film to the substrate surface of the sub-component. For example, 3M manufactures a 98% reflective thin film using a stack of birefringent material. Since this highly reflective film is very thin, it can easily be bent and/or bonded to the inside surface of the "L"-shaped sub-components of the present invention.

Figure 11:
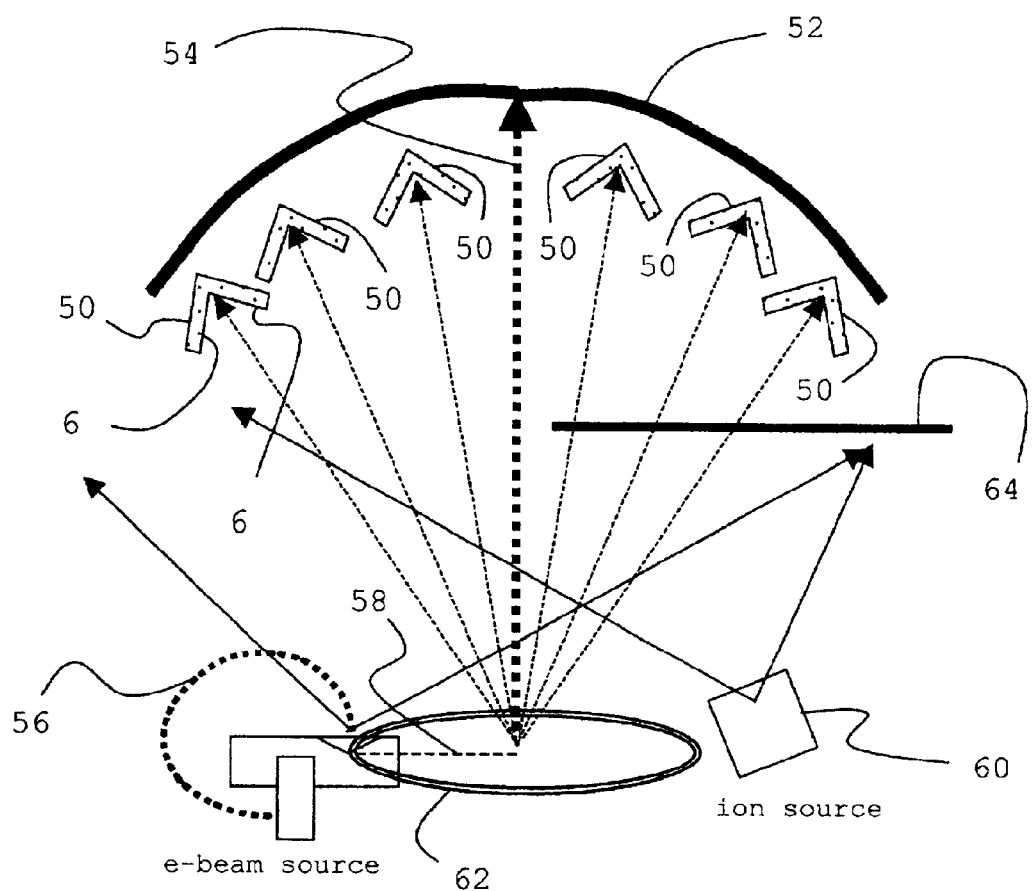
FIG. 11 schematically shows a preferred orientation of "L"-shaped sub-components during a thin film, ion assisted e-beam vacuum depositing process.

One of the preferred manufacturing process steps of the present invention for application of at least some of layers comprising the reflective thin film stack 40, is in particular, an ion-assisted e-beam vacuum thin film deposition processes. FIG. 11 schematically shows such a preferred ion assisted, e-beam thin film vacuum deposition system with a preferred sub-component and system layout. The "L"-shaped sub-components, i.e. the coating substrates 50 are preferably mounted on a dome structure 52 that rotates along its symmetry axis 54. An e-beam source 56 is mounted at an offset distance 58 ($\geq 0$) from the symmetry axis 54 and emits thin film material thus coating the substrates 50 mounted on the dome 52. An ion source 60 is angled towards the dome center and exposes on the substrates 50, the freshly deposited material from the e-beam source to both with oxygen ions and molecules.

The energy transfer (collision) of oxygen ions to the deposited thin film molecules and atoms increases their effective mobility and thus aids in the densification of the respective thin film. This oxygen bombardment of the freshly deposited film also helps to fully oxidize any partially oxygen-deprived deposited material, like for example evaporated and partially dissociated $TiO_x$, $SiO_x$, $Ta_2O_x$, etc. Thus, this preferred deposition process reduces the absorption and porosity of a resulting thin film, thereby enabling the deposition of an over-coated, denser, harder and more environmentally stable Ag film, where each individual layer has more bulk material like properties.

An ion-energy of 100–500 ev with a typical value of 100–300 eV is preferred to avoid radiation damage to the thin film material. The coating material deposition rate has to be adjusted to the available ion dosage of the ion source 60 and to the background gas pressure to allow full oxidation of the respective metal oxide films, ($TiO_2$, $Ta_2O_5$, $ZrO_2$, etc.). The ion source 60 can be operated continuously or in a pulsed mode. For example, for the deposition of $TiO_2$, $SiO_2$ or $Ta_2O_5$ a continuous ion source operation with sufficient ion current density during thin film deposition is adequate, but a pulsed operation works as well, as long as the deposited material between the ion pulse gets fully oxidized. For fluoride containing thin film materials (low index layers like $MgF_2$, $BaF_2$, $CaF_2$, etc.) a preferred enhancement of the present invention is the use of a pulsed oxygen ion beam operation mode with sufficient pulse frequency, on/off timing window and ion current dosage to densify the deposited thin film before it gets too thick (<20 nm, typically less than 0.5–3 nm), while minimizing the energy and ion current to preclude radiation damage to the deposited thin film material. Such radiation damage can for example increase the absorption characteristics of the thin film and/or its index by replacing some of the fluorine atoms with oxygen atoms and thus change the material properties of the thin film. In this preferred manner, hard, dense and environmentally stable thin films can be made with fluoride as well as with oxide-based thin film materials.

Due to the ability on an effective thermal energy transfer of up to an effective equivalent substrate temperature of 1000 K to the deposited thin film molecules without heating up the substrate surface temperatures above 100 C such an ion-assisted e-beam deposition enables the deposition of hard and durable films onto substrates that can't be exposed to elevated temperatures without a resulting performance loss. Thus, this preferred embodiment of the present invention enables the deposition of environmentally stable highly reflective coatings onto plastic and other low temperature substrates 39 and surface enhancement layers 40.

Such an ion-assisted, low surface temperature, thin film deposition process enables the manufacturing of multi-layer thin film stacks containing at least one Ag layer, since a thin Ag film can't be exposed to temperatures much above 100 C before re-crystallization effects cause its surface roughness to increase and cause a specular reflectivity loss. For the first 50–100 nm (until the film is nucleated) of the respective Ag film deposition, it is preferable to also include oxygen ion-assistance to facilitate the adhesion of the Ag film to the underlying substrate 39and/or surface enhancement layer 40 and to provide a more environmentally stable Ag layer. The remaining Ag layer can be done without or with oxygen ion assistance (pulsed or continuous) depending if maximum environmental stability or maximum spectral reflectivity is desired (1–2% effect). The oxygen does in general not mix with the co-deposited Ag atoms, but rather collects in the Ag grain boundaries thus providing an encapsulation and environmental protection layer and fills the grain boundary gaps, thus further protecting Ag from the environment, making it less sensitive to sulfur exposure found in ppm quantities in the atmosphere. The 1994 published Ph.D. thesis of Wayne Gregory Sainty from the University of Sydney, Australia, which for brevity is incorporated herein by reference, describes in detail such an environmentally stable, oxygen ion-assisted, Ag based thin film Hohenegger et all I and II, TiO and SiO as barrier and reflectivity enhancing layers. This process is able to achieve environmentally stable Ag layers without any ZnS layer, contrary to the prior art from Hohenegger.

Due to the rotation of the dome 52, the substrate sees an effective ring e-beam source 62 as the source for material flux depositing onto the substrates 50, with the center of the effective ring e-beam source representing the average emission source of thin film material for this particular thin film emission source. The distance and angular orientation of each such substrate 50 is preferably adjusted in such a manner that each optically functional surface of the "L"-shaped sub-component gets a similar coating deposition rate. The curvature of the dome 52, the e-beam offset distance 58 and the shape of the uniformity correction mask 64 are preferably chosen together so that the deposition rate for each respective substrate 50 is substantially the same.

The orientation of each substrate 50 inside a coating deposition system is preferably done such that each of the two edges connected optically usable surfaces get substantially the same material deposition rate. For the system shown in FIG. 11 that means both connected sides of the "L"-shaped substrate are oriented in such a manner that they have a similar incident angle to the point of origin of the effective e-beam ring source 62.

In this manner, more than 500 "L"-shaped sub-components with a diagonal dimension of approximately 8 mm can be coated inside a 36-inch diameter chamber at the same time, and the desired reflectivity enhancing coating 6 can be produced uniformly with respect to the two optically functional surfaces of the "L"-shaped substrates 50. Since in this manner the coating doesn't have to be broken near an edge of an optically functional surface, this process allows the production of an inherently more environmental stable Ag coated sub-component.

Modification of the deposition system shown in FIG. 11 to include or replace the e-beam source 56 with a thermal, non ion-assisted e-beam source, a spattering source, etc., will become obvious to those skilled in the art based on the above teachings and are included therefore without limitations.

Figure 12:
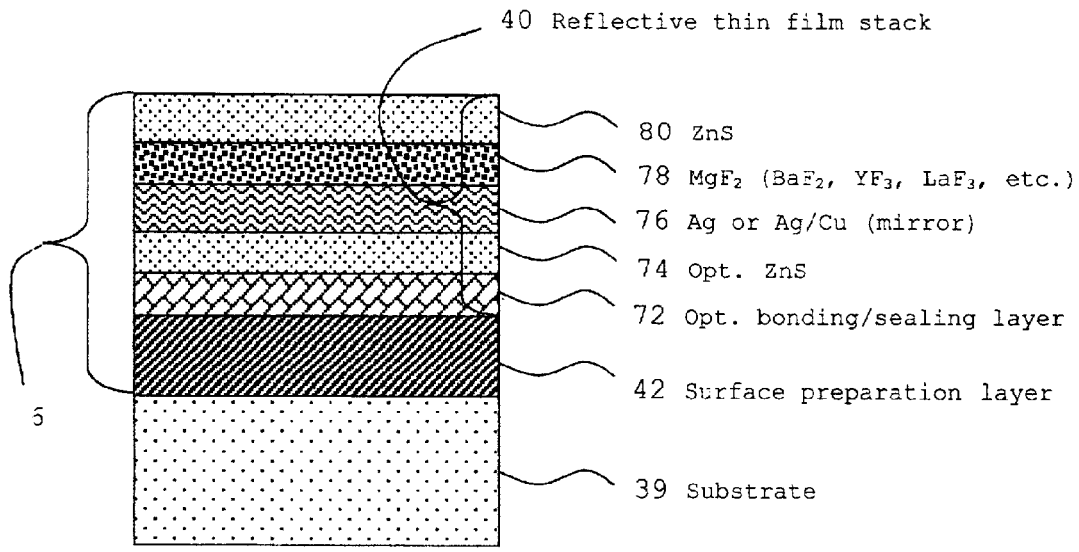
FIG. 12 shows a preferred embodiment of the present invention utilizing a prior art thin film coating layer design family as used on a sub-component of the present invention.

FIG. 12 shows a non-scale view of another embodiment of the present invention comprising the application of a prior art environmentally stable Ag thin film coating stack 40 on top of the substrate 39 of a respective sub-component of a hollow reflective tube of present invention. Optionally, a surface preparation layer 42 can be added between the substrate 39 and the thin film layer stack 40. The reflective enhancing coating 6 shown in FIG. 12 represents here the family of Ag-based reflective coating designs discussed in Hohenegger I. Such a preferred thin film coating stack 40 may include an optional bonding/sealing layer 72, an optional a layer of zinc sulfide (ZnS) layer 74 placed between this bonding/sealing layer 72 and the Ag or Ag/Cu alloy layer 76, followed by a low refractive index layer 78 of a metallic fluoride compound, which in turn is overcoated with an external surface high index layer of ZnS 80. Similarly the combination of the Ag-based coating design family discussed in Hohenegger II with the sub-component of the present invention is another preferred embodiment of the present invention.

Figure 13:
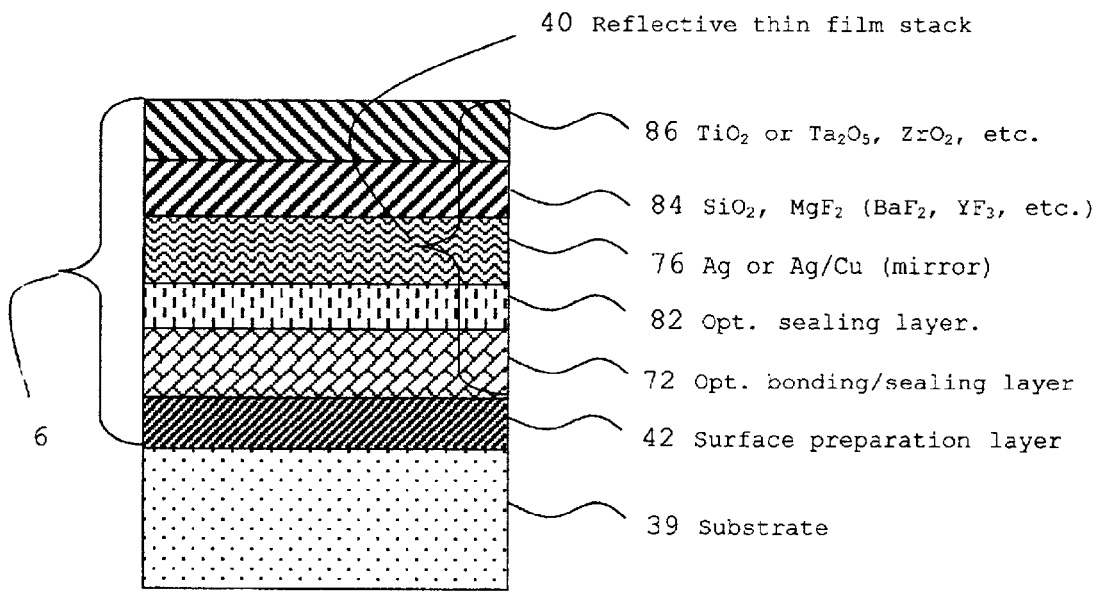
FIG. 13 shows a description of another preferred embodiment of the present invention utilizing a different prior art thin film coating layer design family as used on a sub-component of the present invention.

FIG. 13 depicts another preferred implementation of this invention producing an environmental stable Ag coating compatible with the present invention. The high refractive index material shown in FIG. 12 as ZnS layer 74 or 80 has been replaced in FIG. 13 with a metal oxide high index material 82 (for example $TiO_2$, $Ta_2O_5$, $ZrO_2$, etc). The low refractive index layer 84 now includes the materials of the metallic fluoride compound family as well as of the oxide family (for example $SiO_2$, $SiO_x$, $Al_2O_3$, MgO, $Y_2O_3$, etc.). The various thin films preferable are being deposited with the assistance of an oxygen ion beam and its operation mode is either continuous or pulsed depending on the type of material deposited and the respective layer thickness of the material.

The optional bonding/sealing layer 72 in FIG. 13 is preferably made from thin film materials like $SiO_2$, $TiO_2$, ZnS or other compatible metal oxide or metal sulfide thin film depositable materials. Such an optional sealing layer can be chosen to environmentally insulate the Ag from potential migration of contaminant material into the Ag layer 76.

While the invention has been described with reference to specific details and examples of the preferred embodiments, it will be understood by those skilled in the art that various changes may be made and equivalents may be substituted for elements thereof, without departing from the spirit and scope of the invention. In addition, many modifications may be made to adapt a particular situation or material to the teachings of this invention without departing from the essential scope thereof. Therefore, it is intended that the invention not be limited to the particular embodiments disclosed as the best mode contemplated for carrying out this invention, but that the invention will include all embodiments falling within the scope of the claims below and their legal equivalents.

We claim:

1. A Projection display system comprising:
    a lamp-reflector combination for collection of electromagnetic energy emitted from a lamp having an electromagnetic energy emission source S and for concentration of a portion of said collected energy, thus forming a respective spatial and angular reformatted secondary source S';

a hollow reflective tube having a rectangular cross section at its output port and having an input side located near said secondary source S';

a configurable illumination target comprising at least one configurable pixel generating at least one processed output beam;

a coupling optic collecting a portion of electromagnetic energy emitted by said hollow reflective tube and providing an illumination beam for said configurable illumination target; and a projection optic collecting a portion of said at least one processed output beam from said configurable illumination target and further including means to translate said collected processed output beam portion into a scaled image of said configurable illumination target at a remote display target; and further characterized by said hollow reflective tube comprising two sub-components having two optical functional surfaces in the form of an "L"-like shape, wherein the spectral-and angular dependent reflectivity of said two optical functional surfaces on the inside of said sub-component is substantially equivalent in at least one wavelength interval of interest and at least one angle interval of interest.

2. The hollow reflective tube of claim 1, wherein the optical functional use of said reflective cube inside said illumination system is selected from a group consisting of an integrator, an angle converter and the combination of an integrator and an angle converter.

3. The hollow reflective tube of claim 1, further characterized by having at least one plane of symmetry parallel to the longest dimension of said tube, wherein said tube is comprised of at least two of said "L"-shaped sub-components.

4. The hollow reflective tube of claim 1, wherein the substrate of at least one "L"-shaped sub-component is placed inside a reflective film producing deposition system and oriented symmetrically towards the average incident direction of the deposition material emitted from the effective thin film material emission source of said deposition system.

5. The hollow reflective tube of claim 1, wherein said "L"-shaped sub-component is made from a material selected from the group consisting of plastic, glass filled plastic, metal, glass, ceramic, glass ceramic and composite materials.

6. The hollow reflective tube of claim 1, wherein said "L"-shaped sub-component is manufactured by a method selected from the group consisting of pressing, stamping, hydro-forming, injection molding, compression molding, transfer molding, extrusion, drawing, forging, machining, electroforming, sintering, firing, and casting.

7. The hollow reflective rube of claim 1, wherein said "L"-shaped sub-component is further characterized by having incorporated therein self-alignment features to facilitate assembly into the final shape of said hollow cube.

8. The hollow reflective cube of claim 1, wherein said "L"-shaped sub-component is further characterized by having mounting features incorporated therein to facilitate mounting of said hollow reflective tube to a reference structure in said illumination system.

9. The hollow reflective tube of claim 1, further characterized by the "L"-shaped sub-component having reflectivity enhancing coatings thereon, said coatings deposited by a method selected from a group consisting of chemical vapor deposition, electron beam deposition, ion-assisted, electron beam deposition, thermal evaporation, microwave-assisted sputtering, reactive sputtering, direct current sputtering, alternating current sputtering, dip coating, spin coating, spray coating, and plasma coating.

10. The hollow reflective tube of claim 1, further characterized by having a surface preparation layer thereon, said surface preparation layer serving to reduce the surface roughness of the bare substrate of said "L"-shaped sub-component.

11. The hollow reflective tube of claim 1, having a multi-layer reflective thin film coating stack deposited on the inside of said "L"-shaped sub-component, said reflective thin film coating stack being formed from materials selected from a group consisting of Ag, Ag—Cu mixture, ZnS, metal oxides, SiO2, and metal fluorides.

12. The hollow reflective tube of claim 1, having a multi-layer reflective thin film coating stack deposited on the inside of said "L"-shaped sub-component, said reflective thin film coating stack being formed from materials selected from a group consisting of Ag, Ag—Cu mixture, TiO2 and SiO2, and with at least one of said materials being deposited with an oxygen ion assisted, e-beam vacuum deposition system.

13. The hollow reflective tube of claim 1, wherein said "L"-shaped sub-component has a reflective thin film bonded to its surface.

14. The hollow reflective tube of claim 1, wherein a plurality of said sub-components are fabricated together as a unit, a coating is applied to said sub-components as a unit, and then said sub-components are separated.

* * * * *